United States Patent
Bos et al.

(10) Patent No.: US 11,409,995 B2
(45) Date of Patent: Aug. 9, 2022

(54) ANOMALY DETECTION BY CLASSIFYING PAST BEHAVIOR

(71) Applicant: NXP B.V., Eindhoven (NL)

(72) Inventors: Joppe Willem Bos, Wijgmaal (BE); Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 593 days.

(21) Appl. No.: 16/554,192

(22) Filed: Aug. 28, 2019

(65) Prior Publication Data

US 2021/0064933 A1     Mar. 4, 2021

(51) Int. Cl.
*G06K 9/62*     (2022.01)
*G06N 20/00*   (2019.01)

(52) U.S. Cl.
CPC ......... *G06K 9/6262* (2013.01); *G06K 9/6227* (2013.01); *G06K 9/6259* (2013.01); *G06K 9/6269* (2013.01); *G06N 20/00* (2019.01)

(58) Field of Classification Search
None
See application file for complete search history.

(56) References Cited

U.S. PATENT DOCUMENTS

| 2021/0064933 | A1* | 3/2021 | Bos | G06K 9/6267 |
| 2021/0224599 | A1* | 7/2021 | Tajima | G06K 9/6276 |
| 2021/0272016 | A1* | 9/2021 | Veshchikov | G06F 11/0751 |
| 2021/0334656 | A1* | 10/2021 | Sjögren | G06N 3/08 |
| 2022/0171827 | A1* | 6/2022 | Maiyuran | G06F 9/3001 |
| 2022/0172061 | A1* | 6/2022 | Willmott | G06K 9/6267 |

OTHER PUBLICATIONS

Barreno, Marco, et al. "Can machine learning be secure?." In Proceedings of the 2006 ACM Symposium on Information, computer and communications security, pp. 16-25. (ACM, 2006).
Lane, Terran, et al. "An application of machine learning to anomaly detection." In Proceedings of the 20th National Information Systems Security Conference, vol. 377, pp. 366-380. (Baltimore, USA, 1997).

\* cited by examiner

*Primary Examiner* — Randolph I Chu

(57) ABSTRACT

Various embodiments relate to a method for detecting anomalies in a system by an anomaly detector, including: receiving a trained machine learning model that detects anomalies; receiving a set of new inputs from the to the anomaly detector from the system; setting a label for each of the set of new inputs to a value indicating normal operation of the system; training a new anomaly detection model using incremental learning to update the trained machine learning model using the labeled set of new inputs; receiving a set of past model inputs with an associated label; producing a verification set by inputting the set of past model inputs into the new anomaly detection model; and comparing the verification set with the labelled past model inputs to determine if an anomaly is present.

21 Claims, 3 Drawing Sheets

ANOMALY DETECTION BY CLASSIFYING PAST BEHAVIOR

TECHNICAL FIELD

Various exemplary embodiments disclosed herein relate generally to anomaly detection by classifying past behavior.

BACKGROUND

Anomaly detection is a technique which aims to detect abnormal behavior. Often this is done using machine learning techniques and models that learn to recognize normal behavior and can distinguish between normal and abnormal behavior. The notion of normal and abnormal depend on the usage of the system and is use-case dependent.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for detecting anomalies in a system by an anomaly detector, including: receiving a trained machine learning model that detects anomalies; receiving a set of new inputs by the anomaly detector from the system; setting a label for each of the set of new inputs to a value indicating normal operation of the system; training a new anomaly detection model using incremental learning to update the trained machine learning model using the labeled set of new inputs; receiving a set of past model inputs with an associated label; producing a verification set by inputting the set of past model inputs into the new anomaly detection model; and comparing the verification set with the labelled past model inputs to determine if an anomaly is present.

Various embodiments are described, wherein the presence of an anomaly is determined when any items in the verification set do not match the labelled past model inputs.

Various embodiments are described, wherein the presence of an anomaly is determined when the number of items in the verification set that do not match the labelled past model inputs exceeds a threshold value.

Various embodiments are described, further including: receiving a set of labelled training data for the system; and training a machine learning model to produce the trained machine learning model that detects anomalies.

Various embodiments are described, further including detecting anomalies using both the output of the trained machine learning model and the new anomaly detection model.

Various embodiments are described, further including when an anomaly is present in the verification set: (a) dividing the new set of new inputs into a plurality of subsets; (b) setting a label for each of the set of new inputs to a value indicating normal operation of the system; (c) training a plurality of new anomaly detection models using incremental learning to update the trained machine learning model using each of the labeled subset of new inputs; (d) producing a set of verification subsets by inputting the set of past model inputs into the each of the plurality of new anomaly detection models; and (e) comparing each of the plurality of verification sets with the labelled past model inputs to determine if an anomaly is present in each of the plurality of subsets of new inputs.

Various embodiments are described, further including repeating the steps (a) to (e) subsets of new input data until individual input data are identified as causing anomalies.

Further various embodiments relate to a system for detecting anomalies in a system by an anomaly detector, including: a memory; a processor coupled to the memory, wherein the processor is further configured to: receive a trained machine learning model that detects anomalies; receive a set of new inputs from the system; set a label for each of the set of new inputs to a value indicating normal operation of the system; train a new anomaly detection model using incremental learning to update the trained machine learning model using the labeled set of new inputs; receive a set of past model inputs with an associated label; produce a verification set by inputting the set of past model inputs into the new anomaly detection model; and compare the verification set with the labelled past model inputs to determine if an anomaly is present.

Various embodiments are described, wherein the presence of an anomaly is determined when any items in the verification set do not match the labelled past model inputs.

Various embodiments are described, wherein the presence of an anomaly is determined when the number of items in the verification set that do not match the labelled past model inputs exceeds a threshold value.

Various embodiments are described, wherein the processor is further configured to: receive a set of labelled training data for the system; and train a machine learning model to produce the trained machine learning model that detects anomalies.

Various embodiments are described, wherein the processor is further configured to detect anomalies using both the output of the trained machine learning model and the new anomaly detection model.

Various embodiments are described, wherein when an anomaly is present in the verification set, the processor is further configured to: (a) divide the new set of new inputs into a plurality of subsets; (b) set a label for each of the set of new inputs to a value indicating normal operation of the system; (c) train a plurality of new anomaly detection models using incremental learning to update the trained machine learning model using each of the labeled subset of new inputs; (d) produce a set of verification subsets by inputting the set of past model inputs into the each of the plurality of new anomaly detection models; and (e) compare each of the plurality of verification sets with the labelled past model inputs to determine if an anomaly is present in each of the plurality of subsets of new inputs.

Various embodiments are described, wherein the processor is further configured to repeat the steps (a) to (e) subsets of new input data until individual input data are identified as causing anomalies.

Further various embodiments relate to a non-transitory machine-readable storage medium encoded with instructions for execution by an anomaly detector, the non-transitory machine-readable storage medium, including: instructions for receiving a trained machine learning model that detects anomalies; instructions for receiving a set of new inputs by the anomaly detector from the system; instructions for setting a label for each of the set of new inputs to a value indicating normal operation of the system; instructions for training a new anomaly detection model using incremental learning to update the trained machine learning model using the labeled set of new inputs; instructions for receiving a set of past model inputs with an associated label; instructions for producing a verification set by inputting the set of past model inputs into the new anomaly detection model; and instructions for comparing the verification set with the labelled past model inputs to determine if an anomaly is present.

Various embodiments are described, wherein the presence of an anomaly is determined when any items in the verification set do not match the labelled past model inputs.

Various embodiments are described, wherein the presence of an anomaly is determined when the number of items in the verification set that do not match the labelled past model inputs exceeds a threshold value.

Various embodiments are described, further including: instructions for receiving a set of labelled training data for the system; and instructions for training a machine learning model to produce the trained machine learning model that detects anomalies.

Various embodiments are described, further including instructions for detecting anomalies using both the output of the trained machine learning model and the new anomaly detection model.

Various embodiments are described, further including when an anomaly is present in the verification set: (a) instructions for dividing the new set of new inputs into a plurality of subsets; (b) instructions for setting a label for each of the set of new inputs to a value indicating normal operation of the system; (c) instructions for training a plurality of new anomaly detection models using incremental learning to update the trained machine learning model using each of the labeled subset of new inputs; (d) instructions for producing a set of verification subsets by inputting the set of past model inputs into the each of the plurality of new anomaly detection models; and (e) instructions for comparing each of the plurality of verification sets with the labelled past model inputs to determine if an anomaly is present in each of the plurality of subsets of new inputs.

Various embodiments are described, further including repeating the instructions of (a) to (e) on subsets of new input data until individual input data are identified as causing anomalies.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
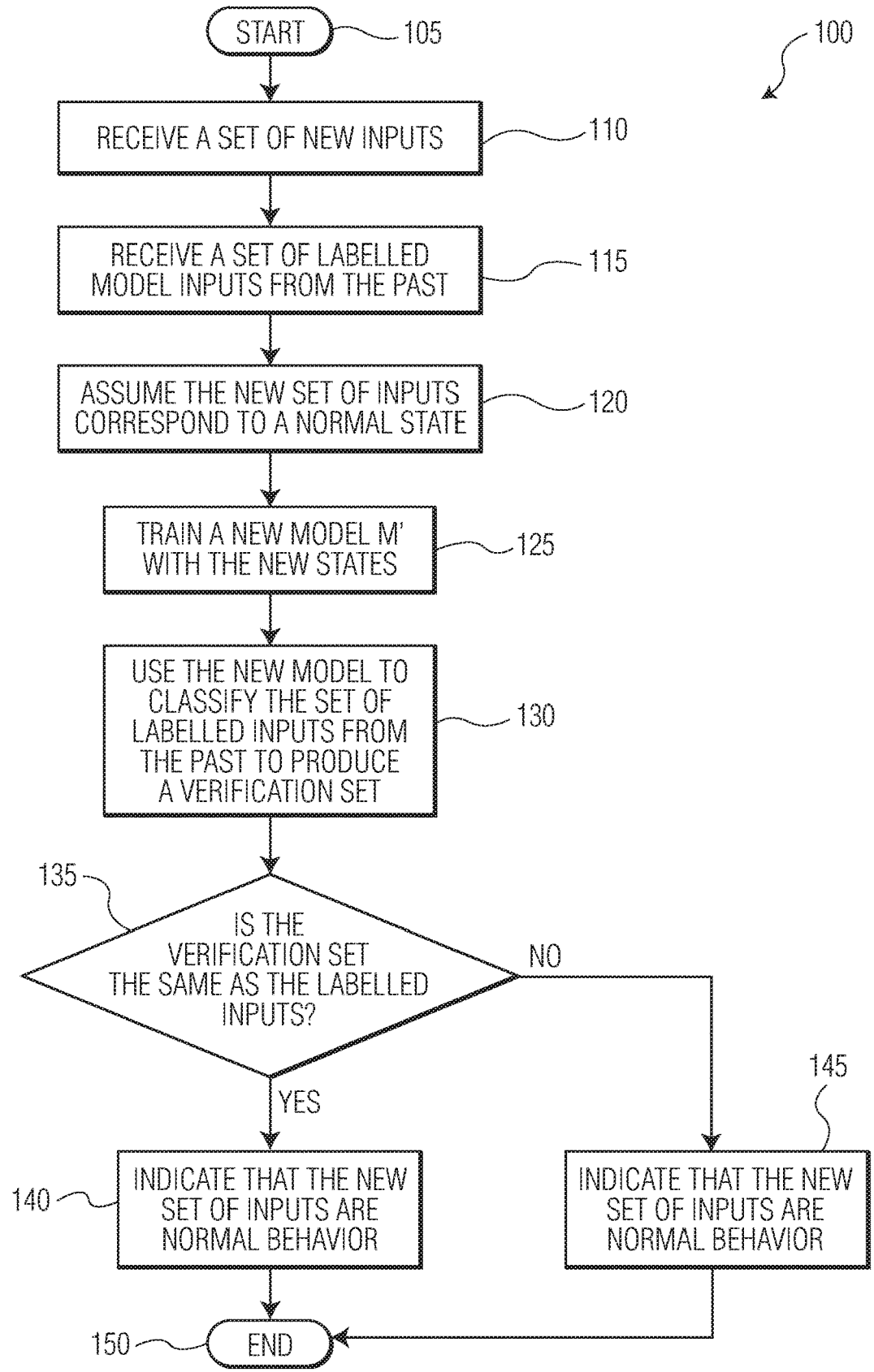
FIG. 1 illustrates a method for detecting anomalies used by the anomaly detection system.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Building an anomaly detection system based on machine learning is difficult. Many systems generate large amounts of system state data. Typically, a machine learning anomaly detection system will be developed based upon a large dataset that has a large number of labeled system states, i.e., each system state will be labeled normal or abnormal. A machine learning architecture is then selected and trained using the training dataset to define the parameters of the machine learning anomaly model. Examples of machine learning model architectures include support vector machines (SVM), linear classifiers, nearest neighbor, decision trees, boosted trees, random forests, and neural networks. During training, various aspects and parameters of the machine learning model and architecture may be used in order to optimize a loss function associated with the training process. Once the machine learning anomaly detection model has been defined, it may be deployed for use. As many complex systems may have many different anomalies, the training set may not include a number possible anomalous states. The question then becomes how to best determine if new input data about the state of the system is from normal or abnormal behavior, especially when a new anomaly may not have been represented in the original training data? An embodiment of an anomaly detection system will be described that takes in new data and uses incremental learning to determine if the newly received data may include an anomaly.

The anomaly detection system monitors a system S for anomalies. These anomalies may be use-case specific, user-defined, or anything which falls outside the scope of a predefined set of normal behaviors. Examples include intrusion detection and sensors which start to act differently (i.e., malfunction detection).

For a system S, a machine learning model $M:I \rightarrow A$ is trained, where I is the input domain and $A=\{0,1\}$ is the output, which output indicates if the machine learning model M determines that there is an anomaly (1) or not (0). This model results after applying a training function $T:M \times I^n \times S^n \times \delta \rightarrow M$, which takes as input an (optional) machine learning model M, n input values $I^n$ with corresponding labels $S^n$ indicating whether these inputs correspond to an anomaly or not, and auxiliary data from a domain $\delta$. The machine learning model M is of a certain type having a defined architecture. Any type of machine learning model may be used here that is capable is being used in the specific application and environment of the anomaly detection system. The auxiliary data $\delta$ may include parameters associated with the specific machine learning model M architecture and other parameters such a hyperparameters used in training the model.

FIG. 1 illustrates a method 100 for detecting anomalies used by the anomaly detection system. The system S periodically generates one or more new inputs $\alpha \in I$ which needs to be classified as to whether they correspond to abnormal behavior. This new input data $\alpha$ is received by the anomaly detection system 110 and may be used as follows to determine if the new data identifies or indicates an anomaly in the system S. The system S then records and sends to the anomaly detection system a number of labelled inputs from the past $(\Omega, \Lambda) \subseteq (I, A)$ 115. Next, the anomaly detection system assumes that this input state $\alpha$ corresponds to a normal state of the system 120. Then the anomaly detection system trains a new model $M'=T(M, \alpha, 0, \delta)$ with these new states using, for example, incremental learning 125. This new model is used to classify the previous values $\Omega$ from the past 130 to produce a verification set:

$$V=\{M'(\omega)|M'=T(M,\alpha,0,\delta)\wedge\omega\in\Omega)\}.$$

If $V=\Lambda$, i.e., the elements of the verification set match the labels for the inputs from the past (or enough values are the same when using a threshold, e.g., for a set of 10 past samples if 9 of them match) 135 then it may be concluded that the original assumption was correct and $\alpha$ is indeed normal behavior 140. When this is not the case then this assumption is wrong and an anomaly should be indicated 145.

The number of samples of new input data $\alpha$ may be chosen based upon the specific application. The fewer the number of new inputs, the more granular the ability to identify anomalies. The tradeoff is that the retraining using iterative learning has to be repeated more often or at a higher frequency, which increases the processing load and possibly adds delays in identifying anomalies. As a result these parameters will be application specific depending upon the speed at which anomalies need to be detected, the processing available, the rate at which anomalies occur, and the granularity needed for detecting anomalies.

Also, in comparing the verification set obtained with the new model to inputs from the past a complete match between the sets or that a threshold number of items match may be required. Again, the number of past inputs used may be selected based upon the desired statistical certainty required for a match. That is the larger the number of past inputs used, the more likely it is that an anomaly will be accurately detected. This needs to be balanced with the additional processing time it will take to run the new model on each of the past inputs. Again, there is a tradeoff between the speed at which anomalies need to be detected and the processing available and the number of past inputs used. Also, if a threshold number is used to determine the presence of an anomaly, then this value may be set based upon statistical certainty needed and an understanding of the statistical aspects of the anomalies. Also, this threshold may be based upon the rate as which anomalies are falsely identified using this method.

It is noted that if the comparison of the verification set to the prior labelled inputs indicates an anomaly, then all that is known is that one of the new inputs is an anomaly. In some situations, the ability to detect an anomaly is all that is needed to then trigger a warning so that protective measures may be taken by the system S. In other situations, it may be desired to determine which of the new inputs indicates the anomaly. In such a case, a newly discovered anomaly may be analyzed by the anomaly detection system or a human, and then later be used to further train a machine learning model with this new anomaly. The set of new inputs may include 5, 10, 50, or more inputs. In order to identify a specific new input or inputs as the source of the anomaly, each element of the new inputs may be tested individually. As in most systems anomalies are rare, so the need to further find the specific new input(s) causing the anomaly will not need to be done often depending upon the specific application. Further, if the number of new inputs is large, then an iterative search may be performed on the new inputs to determine the specific inputs causing the anomaly. For example, if 256 new inputs are collected, then they could be divided into 8 sets of 32 inputs and each of the 8 sets checked for anomalies according the method 100. Then only sets of 32 that indicate anomalies, could then be divided into 8 sets of 4 inputs, and again each set tested. Then any sets of 4 indicating anomalies, could have each input individually tested. Note, that this process would require multiple iterations of retaining the model M, which would add processing load to the anomaly detection process. This could be done in real time if the processing is available and the result can be obtained in a timely fashion. If identifying the specific input responsible for the anomaly is not needed in real time, the search for the anomaly may be offloaded to another system or performed by the anomaly detection system when the processing resources are available.

It is noted that the anomaly detection system described herein may be used along with a typical anomaly detection method. Multiple sources for detecting anomalies provides for a better ability to detect anomalies overall. For example, the model M is developed that seeks to detect anomalies using normal known machine learning techniques; the model M is run on all inputs to detect anomalies. In addition, the method 100 for detecting anomalies by the anomaly detection system as described herein may also be used to further determine if anomalies are present, which may detect anomalies that the model M would not detect.

Figure 2:
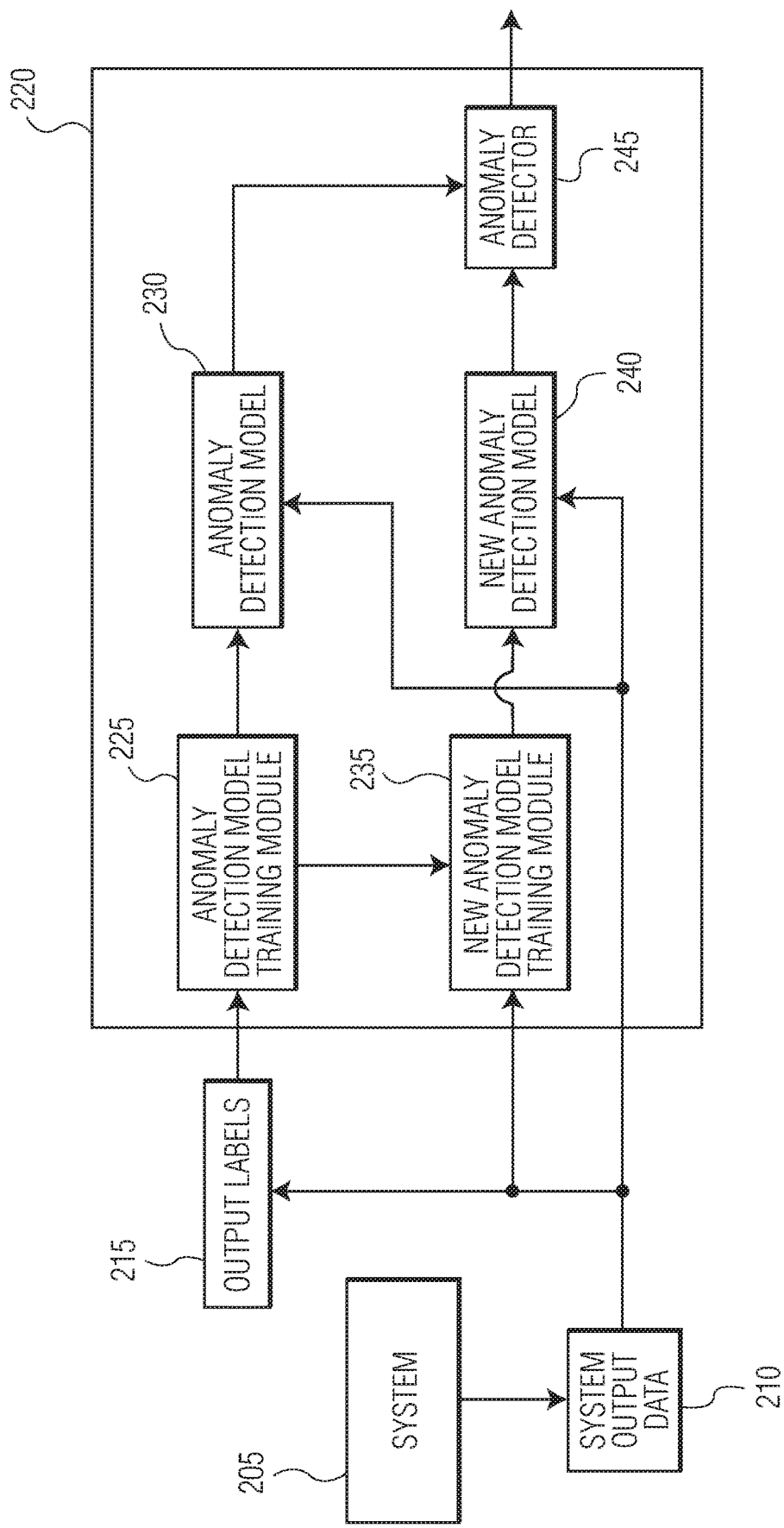
FIG. 2 illustrates a block diagram that includes an anomaly detection system.

FIG. 2 illustrates a block diagram that includes an anomaly detection system. The anomaly detection system 220 may monitor a system of interest 205. The system 205 outputs system output data 210. Further, output labels 215 indicating whether the output data indicates a normal or anomalous state may be applied to a set of output data 210 from the system. This may be done using various methods and may be based upon prior data that was collected and that was then determined to indicate the presence of an anomaly. The anomaly detection training module 225 receives the labelled data and a model M is trained using the labelled input data to produce the anomaly detection model 230. The anomaly detection model training module 225 also inputs the trained model M into the new anomaly detection model training module 235. As described above, the new anomaly detection training module also receives a set of new system output data and uses iterative training to produce a new anomaly detection model 240 described above. The new anomaly detection model 240 then receives a verification set of input data and produces a set of verification outputs to the anomaly detector 245. The anomaly detector 245 compares the verification outputs with the output labels in the verification set of input data and determines whether an anomaly is present as described above. Further, the anomaly detector 245 may also use the anomaly detection outputs of the anomaly detection model 230 that may also be used to detect anomalies in the system output data. Also, as described above the anomaly detection system 220 may also seek to determine which specific system output(s) caused any detected anomalies by splitting the set of new system output data into smaller groups and determining which group(s) have an anomaly, and the process is repeated until specific system outputs causing anomalies have been identified.

There are many possible applications the anomaly detection system described herein. The system to be monitored may be an industrial system where a sensor is for example monitoring an conveyor belt. In this case a monitoring device, which may be an internet of things (IoT) device, monitors various aspects of the conveyer belt and determines using the anomaly detection system whether an anomaly has occurred. This may be done to determine if an unsafe situation occurs or to detect the presence of malware in the system. It might also detect components in the system that are starting to wear out.

In the example of an IoT device, the anomaly detection system may monitor characteristics of the device such as the cache behavior of the device, the number of branch decision taken or not, or the number of CPU cycles.

Figure 3:
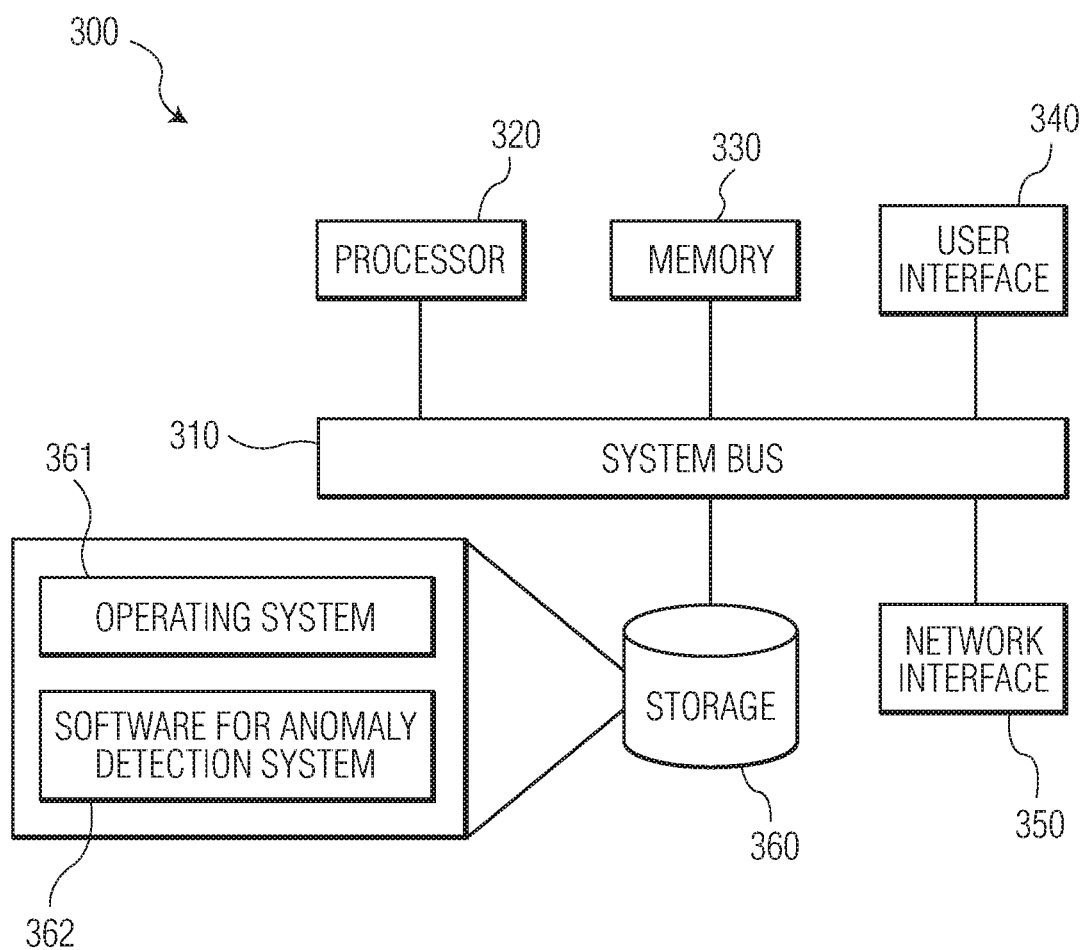
FIG. 3 illustrates an exemplary hardware diagram for implementing an anomaly detection system show in FIGS. 1 and 2.

FIG. 3 illustrates an exemplary hardware diagram 300 for implementing an anomaly detection system illustrated in FIGS. 1 and 2. As illustrated, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, microcontroller, graphics processing unit (GPU), field programmable gate array (FPGA), application-specific integrated circuit (ASIC), or other similar devices.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices.

The user interface 340 may include one or more devices for enabling communication with a user as needed. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. The storage 361 may include instructions for implementing the anomaly detection system as described above.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Further, where the device 300 is implemented in a cloud computing system, the various hardware components may belong to separate physical systems. For example, the processor 320 may include a first processor in a first server and a second processor in a second server.

The various embodiments described above provide a technical solution to the problem of anomaly detection in systems. Currently machine learning is used to develop anomaly detection models that receive system outputs and determine if those system outputs indicate an anomaly. The anomaly detection system described herein provides an improvement over current systems and solve the technological problem, that current systems may not detect all anomalies. The current system uses iterative retraining of an anomaly detection model using a set of current system outputs that are then assumed to indicate normal operation. Then older existing inputs are run through the new model and if the indication of an anomaly changes from the prior outputs, then the new inputs indicate an anomaly. This method provides a new way to detect anomalies that a traditional machine learning anomaly detection model may not find. Such an approach may be scaled to be used in applications where there is limited processing capabilities.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for detecting anomalies in a system by an anomaly detector, comprising:

receiving a trained machine learning model that detects anomalies;

receiving a set of new inputs by the anomaly detector from the system;

setting a label for each of the set of new inputs to a value indicating normal operation of the system;

training a new anomaly detection model using incremental learning to update the trained machine learning model using the labeled set of new inputs;

receiving a set of past model inputs with an associated label;

producing a verification set by inputting the set of past model inputs into the new anomaly detection model; and comparing the verification set with the labelled past model inputs to determine if an anomaly is present.

2. The method of claim 1, wherein the presence of an anomaly is determined when any items in the verification set do not match the labelled past model inputs.

3. The method of claim 1, wherein the presence of an anomaly is determined when the number of items in the verification set that do not match the labelled past model inputs exceeds a threshold value.

4. The method of claim 1, further comprising:
receiving a set of labelled training data for the system; and
training a machine learning model to produce the trained machine learning model that detects anomalies.

5. The method of claim 1, further comprising detecting anomalies using both the output of the trained machine learning model and the new anomaly detection model.

6. The method of claim 1, further comprising when an anomaly is present in the verification set:
(a) dividing the new set of new inputs into a plurality of subsets;
(b) setting a label for each of the set of new inputs to a value indicating normal operation of the system;
(c) training a plurality of new anomaly detection models using incremental learning to update the trained machine learning model using each of the labeled subset of new inputs;
(d) producing a set of verification subsets by inputting the set of past model inputs into the each of the plurality of new anomaly detection models; and
(e) comparing each of the plurality of verification sets with the labelled past model inputs to determine if an anomaly is present in each of the plurality of subsets of new inputs.

7. The method of claim 6, further comprising repeating the steps (a) to (e) subsets of new input data until individual input data are identified as causing anomalies.

8. A system for detecting anomalies in a system by an anomaly detector, comprising:
a memory;
a processor coupled to the memory, wherein the processor is further configured to:
receive a trained machine learning model that detects anomalies;
receive a set of new inputs from the system;
set a label for each of the set of new inputs to a value indicating normal operation of the system;
train a new anomaly detection model using incremental learning to update the trained machine learning model using the labeled set of new inputs;
receive a set of past model inputs with an associated label;
produce a verification set by inputting the set of past model inputs into the new anomaly detection model; and
compare the verification set with the labelled past model inputs to determine if an anomaly is present.

9. The system of claim 8, wherein the presence of an anomaly is determined when any items in the verification set do not match the labelled past model inputs.

10. The system of claim 8, wherein the presence of an anomaly is determined when the number of items in the verification set that do not match the labelled past model inputs exceeds a threshold value.

11. The system of claim 8, wherein the processor is further configured to:
receive a set of labelled training data for the system; and
train a machine learning model to produce the trained machine learning model that detects anomalies.

12. The system of claim 8, wherein the processor is further configured to detect anomalies using both the output of the trained machine learning model and the new anomaly detection model.

13. The system of claim 8, wherein when an anomaly is present in the verification set, the processor is further configured to:
(a) divide the new set of new inputs into a plurality of subsets;
(b) set a label for each of the set of new inputs to a value indicating normal operation of the system;
(c) train a plurality of new anomaly detection models using incremental learning to update the trained machine learning model using each of the labeled subset of new inputs;
(d) produce a set of verification subsets by inputting the set of past model inputs into the each of the plurality of new anomaly detection models; and
(e) compare each of the plurality of verification sets with the labelled past model inputs to determine if an anomaly is present in each of the plurality of subsets of new inputs.

14. The system of claim 13, wherein the processor is further configured to repeat the steps (a) to (e) subsets of new input data until individual input data are identified as causing anomalies.

15. A non-transitory machine-readable storage medium encoded with instructions for execution by an anomaly detector, the non-transitory machine-readable storage medium, comprising:
instructions for receiving a trained machine learning model that detects anomalies;
instructions for receiving a set of new inputs by the anomaly detector from the system;
instructions for setting a label for each of the set of new inputs to a value indicating normal operation of the system;
instructions for training a new anomaly detection model using incremental learning to update the trained machine learning model using the labeled set of new inputs;
instructions for receiving a set of past model inputs with an associated label;
instructions for producing a verification set by inputting the set of past model inputs into the new anomaly detection model; and
instructions for comparing the verification set with the labelled past model inputs to determine if an anomaly is present.

16. The non-transitory machine-readable storage medium of claim 15, wherein the presence of an anomaly is determined when any items in the verification set do not match the labelled past model inputs.

17. The non-transitory machine-readable storage medium of claim 15, wherein the presence of an anomaly is determined when the number of items in the verification set that do not match the labelled past model inputs exceeds a threshold value.

18. The non-transitory machine-readable storage medium of claim 15, further comprising:
instructions for receiving a set of labelled training data for the system; and instructions for training a machine learning model to produce the trained machine learning model that detects anomalies.

19. The non-transitory machine-readable storage medium of claim 15, further comprising instructions for detecting anomalies using both the output of the trained machine learning model and the new anomaly detection model.

20. The non-transitory machine-readable storage medium of claim 15, further comprising when an anomaly is present in the verification set:
   (a) instructions for dividing the new set of new inputs into a plurality of subsets;
   (b) instructions for setting a label for each of the set of new inputs to a value indicating normal operation of the system;
   (c) instructions for training a plurality of new anomaly detection models using incremental learning to update the trained machine learning model using each of the labeled subset of new inputs;
   (d) instructions for producing a set of verification subsets by inputting the set of past model inputs into the each of the plurality of new anomaly detection models; and
   (e) instructions for comparing each of the plurality of verification sets with the labelled past model inputs to determine if an anomaly is present in each of the plurality of subsets of new inputs.

21. The non-transitory machine-readable storage medium of claim 20, further comprising repeating the instructions of (a) to (e) on subsets of new input data until individual input data are identified as causing anomalies.

\* \* \* \* \*